No. 861,134. PATENTED JULY 23, 1907.
C. A. MANKER.
VESSEL HULL.
APPLICATION FILED MAY 10, 1907.

*Fig. 5.* *Fig. 6.* *Fig. 7.*

Witnesses:
Geo. R. Ladson
Nells L. Church

Inventor,
Carey A. Manker.
By Bakewell Cornwall Attys.

THE NORRIS PETERS CO., WASHINGTON, D. C.

UNITED STATES PATENT OFFICE.

CAREY ALAN MANKER, OF PEARL, ILLINOIS, ASSIGNOR TO MANKER-HEAVNER NAVIGATION COMPANY, OF OMAHA, NEBRASKA, A CORPORATION OF ARIZONA TERRITORY.

VESSEL-HULL.

No. 861,134.  Specification of Letters Patent.  Patented July 23, 1907.

Application filed May 10, 1907. Serial No. 372,995.

*To all whom it may concern:*

Be it known that I, CAREY ALAN MANKER, a citizen of the United States, residing at Pearl, Pike county, Illinois, have invented a certain new and useful Improvement in Vessel-Hulls, of the which the following is a full, clear, and exact description, such as will enable others skilled in the art to which it appertains to make and use the same, reference being had to the accompanying drawings, forming part of this specification, in which—

Figure 1:
Figure 2:
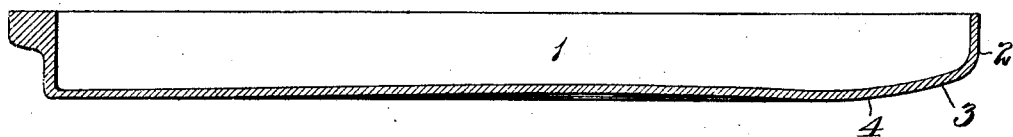
Figure 3:
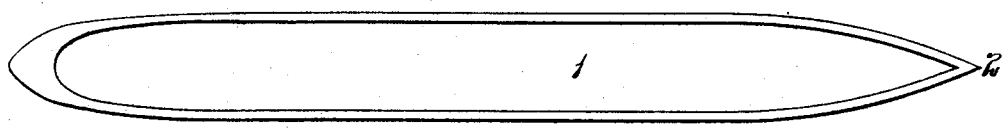
Figure 4:
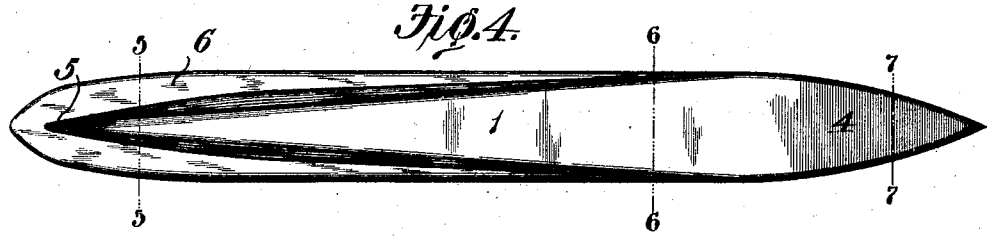
Figure 4:
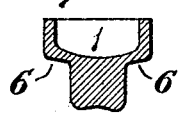
Figure 4:
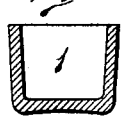
Figure 4:

Figure 1 is a side elevation of a vessel hull constructed in accordance with my invention; Fig. 2 is a vertical longitudinal section through the center of the hull; Fig. 3 is a top plan view of the hull; Fig. 4 is a bottom plan view of same; and Figs. 5, 6 and 7 are cross sectional views taken on the line 5—5, 6—6, and 7—7, respectively, of Fig. 4.

This invention relates to boats or vessels, and particularly to the exterior forms of the hulls of vessels.

The main object of my invention is to provide a vessel hull which is so shaped that it will overcome the resistance of the water through which it travels, thereby enabling the vessel to be propelled with a minimum expenditure of power.

The bow of the hull is pointed and normally lies above the surface of the water, the bottom of the bow curving upwardly so that the bow of the hull will have a tendency to climb up over the waves, and thereby tend to displace water downwardly underneath the bottom of the hull which is concaved transversely and preferably longitudinally so as to provide longitudinally curved surfaces which, as near as possible, express diagrammatically nature's law of accelerated motion.

The portion of the hull which is submerged in the water is of greatest beam adjacent the bow and thence diminishes gradually in width toward the stern of the hull. The hull is provided with stability guards arranged above the water line and extending laterally from approximately midships rearwardly toward the stern of the hull so as to keep the hull from tipping or settling too low in the water.

Referring to the drawings which represent the preferred form of my invention, 1 designates a hull having a pointed bow 2, the bottom of said bow being curved upwardly, as indicated at 3 in Fig. 2, so that the bow will normally lie above the surface of the water and have a tendency to climb up over the waves. The widest portion of the wetted surface of the hull is adjacent the point at which the hull first contacts with the water through which it travels, as indicated by the reference character 4 in Fig. 4, and the portion of the hull below the water line diminishes in breadth gradually from the point 4 towards the stern, the sides of said submerged portion being inclined rearwardly and inwardly until they converge to form a wedge-shaped stern 5, as shown in Fig. 4. Preferably, the sides of the submerged portion are convexed slightly and the bottom of the hull is concaved transversely, as shown in Figs. 4, 5 and 6, said concavity greatly diminishing in width from the forward end to the rearward end of the hull, as indicated more clearly in Figs. 5 and 6. The bottom of the hull is also concaved longitudinally, as shown in Fig. 2, thereby producing longitudinally concaved curves which express diagrammatically, as near as possible, nature's law of accelerated motion.

The hull is provided with stability guards 6 which project laterally therefrom above the water line and add greatly to the stability of the vessel. As shown in Fig. 4, these stability guards commence at a point slightly forward of midships and extend rearwardly toward the stern, increasing gradually in width up to a point adjacent the stern where they diminish in width until the side edges thereof emerge into an approximately round stern portion above the water line so that the main portion of the hull, which is above water line, is substantially cigar-shaped, while that portion of the hull which is submerged is approximately wedge-shaped with the wide portion of the wedge adjacent the bow.

When the hull is at rest it will lie in approximately the position indicated by the full lines in Fig. 1, the widest portion of the stability guards 6 resting on the surface of the water. When the hull travels forwardly, however, its water line will gradually change as the speed of the hull increases, due to the fact that the bow 2 climbs up over the waves and thus deflects them downwardly underneath the concave bottom portion of the hull so that the bow will rise further out of the water, as indicated by the broken lines in Fig. 1, any increase in the speed of the hull causing the bow to rise still further out of the water and thus diminish the displacement of the hull, the stability guards preventing the stern of the hull from settling or being submerged. As the side surfaces of the submerged portion of the hull are inclined inwardly toward the longitudinal axis of the hull from the bow toward the stern, the water through which the hull travels will tend to flow inwardly throughout the entire length of the wetted surface of the hull and thus prevent suction of the water at the stern of the hull and also secure the advantage of side pressure of such inflowing water through a greater portion of the length of the hull than vessels of other types heretofore in use, said side pressure also assisting greatly in the forward travel of the vessel.

Having thus described my invention, what I claim as new and desire to secure by Letters Patent is:

1. A vessel hull provided with a pointed bow having its underneath surface curved upwardly and normally lying above the surface of the water, the sides of the submerged portion of the hull being inclined rearwardly and inwardly from a point adjacent the bow, said submerged portion having a concaved bottom which is narrower at its rear end than at its front end, and stability guards arranged above the water line and projecting laterally from the sides of the stern portion of the hull; substantially as described.

2. A vessel hull having a pointed bow provided with an upwardly curved underneath surface, an approximately wedge-shaped submerged portion, the bottom of which is concaved transversely and longitudinally, and stability guards arranged above the water line and projecting laterally from the sides of the hull; substantially as described.

3. A vessel hull having a pointed bow, the under surface of which is curved upwardly, the submerged portion of the hull being of greatest width adjacent the bow and having its sides inclined rearwardly and inwardly from said widest portion toward the stern of the hull, and stability guards arranged above the water line and projecting laterally from the sides of the hull, said stability guards increasing gradually in width from a point approximately midships toward the stern of the hull; substantially as described.

In testimony whereof I hereunto affix my signature in the presence of two witnesses, this sixth day of May, 1907.

CAREY ALAN MANKER.

Witnesses:
WELLS L. CHURCH,
GEORGE BAKEWELL.